(12) United States Patent
Niwa et al.

(10) Patent No.: US 10,670,148 B2
(45) Date of Patent: Jun. 2, 2020

(54) GASKET FOR INTERNAL COMBUSTION ENGINE

(71) Applicant: MAZDA MOTOR CORPORATION, Hiroshima (JP)

(72) Inventors: Yasushi Niwa, Hiroshima-shi (JP); Kazuya Niida, Hiroshima-shi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/762,750

(22) PCT Filed: Mar. 16, 2017

(86) PCT No.: PCT/JP2017/010601
§ 371 (c)(1),
(2) Date: Mar. 23, 2018

(87) PCT Pub. No.: WO2017/169828
PCT Pub. Date: Oct. 5, 2017

(65) Prior Publication Data
US 2018/0266558 A1 Sep. 20, 2018

(30) Foreign Application Priority Data
Mar. 30, 2016 (JP) .................................. 2016-068179

(51) Int. Cl.
*F16J 15/08* (2006.01)
*F01N 13/18* (2010.01)
*F02B 37/00* (2006.01)

(52) U.S. Cl.
CPC ...... *F16J 15/0818* (2013.01); *F01N 13/1844* (2013.01); *F16J 15/0825* (2013.01); *F02B 37/00* (2013.01); *F16J 2015/0837* (2013.01)

(58) Field of Classification Search
CPC .. F16J 15/0825; F16J 15/0818; F16J 15/0837; F16J 15/0843
See application file for complete search history.

(56) References Cited

U.S. PATENT DOCUMENTS 2,034,610 A * 3/1936 Dickson ............... F16J 15/0831
277/601
4,739,999 A * 4/1988 Ishii ..................... F16J 15/0825
277/595

(Continued)

FOREIGN PATENT DOCUMENTS

CN 101074730 A 11/2007
CN 101251059 A 8/2008

(Continued)

OTHER PUBLICATIONS

International Search Report issued in PCT/JP2017/010601; dated May 23, 2017.

*Primary Examiner* — Kristina R Fulton
*Assistant Examiner* — L. Susmitha Koneru
(74) *Attorney, Agent, or Firm* — Studebaker & Brackett PC (57) ABSTRACT

An internal combustion engine gasket includes a plurality of annular plates that are stacked. Each of the annular plates includes: a through-hole; an inner circumferential portion; a plurality of bolt holes; an outer circumferential portion; and an intermediate portion. The annular plates includes: a grommet plate having a fold-back portion in the inner circumferential portion; and first and second seal plates stacked on both sides of the grommet plate, and having a bead in the intermediate portion. The inner circumferential portion of the first seal plate is wrapped or held by the fold-back portion of the grommet plate. A spacer member is formed between the grommet plate and the first or second seal plate along the entire circumference of the outer cir- (Continued)

cumferential portion so as to have a thickness smaller than or equal to the grommet plate and include all of the bolt holes.

13 Claims, 6 Drawing Sheets

(56) References Cited

U.S. PATENT DOCUMENTS

| | | | | |
|---|---|---|---|---|
| 4,776,601 A | * | 10/1988 | Yamada | F16J 15/061 277/598 |
| 4,799,695 A | * | 1/1989 | Yoshino | F16J 15/0806 277/591 |
| 4,836,562 A | * | 6/1989 | Yoshino | F16J 15/0825 277/595 |
| 4,938,488 A | * | 7/1990 | Udagawa | F16J 15/0825 277/595 |
| 5,082,298 A | * | 1/1992 | Uchida | F16J 15/0825 277/595 |
| 5,087,058 A | * | 2/1992 | Miura | F16J 15/0825 277/595 |
| 5,522,604 A | * | 6/1996 | Weiss | F16J 15/0825 277/594 |
| 5,560,623 A | * | 10/1996 | Yoshino | F16J 15/0825 277/595 |
| 6,168,167 B1 | * | 1/2001 | Aoki | F16J 15/0825 277/593 |
| 6,315,303 B1 | * | 11/2001 | Erb | F16J 15/0825 277/593 |
| 7,014,194 B2 | * | 3/2006 | Udagawa | F16J 15/0825 277/594 |
| 7,055,830 B2 | * | 6/2006 | Udagawa | F16J 15/0825 277/593 |
| 7,108,268 B2 | * | 9/2006 | Udagawa | F16J 15/0825 277/593 |
| 2006/0232016 A1 | * | 10/2006 | Hilgert | F16J 15/0825 277/593 |
| 2007/0267823 A1 | * | 11/2007 | Kinoshita | F16J 15/0825 277/594 |
| 2008/0197579 A1 | * | 8/2008 | Imai | F16J 15/0825 277/593 |
| 2008/0203676 A1 | * | 8/2008 | Yasuda | F16J 15/0825 277/595 |
| 2008/0203677 A1 | | 8/2008 | Yasuda | |
| 2008/0217866 A1 | * | 9/2008 | Tripathy | F16J 15/0818 277/595 |
| 2011/0024992 A1 | | 2/2011 | Yasuda | |
| 2019/0040787 A1 | * | 2/2019 | Niwa | F01N 13/10 |

FOREIGN PATENT DOCUMENTS

| | | |
|---|---|---|
| CN | 101251187 A | 8/2008 |
| JP | H06-43572 Y2 | 11/1994 |
| JP | H06-0543572 Y2 | 11/1994 |
| JP | 2015-187454 A | 10/2015 |
| KR | 10-2014-0044682 A | 4/2014 |
| WO | 2015/105086 A1 | 7/2015 |

* cited by examiner

GASKET FOR INTERNAL COMBUSTION ENGINE

TECHNICAL FIELD

The present disclosure relates to a gasket for an internal combustion engine.

BACKGROUND ART

A gasket interposed between flanges of exhaust system parts provided in an exhaust passage of an internal combustion engine has been known in which a grommet is provided in a half bead to reduce seal leakage due to repeated thermal expansion and shrinkage (for example, see Patent Document 1).

CITATION LIST

Patent Document

PATENT DOCUMENT 1: Japanese Unexamined Patent Publication No. 2015-187454

SUMMARY OF THE INVENTION

Technical Problem

When a gasket is installed in an internal combustion engine, fixing the periphery of the gasket with a plurality of bolts generates a surface pressure generated by a bead. When the cross-section of the gasket comprised of a plurality of plates that are stacked is viewed in the stacking direction, the grommet is formed near the bead. Thus, a portion which is first bolted may be contacted to cause uneven contact, and a portion which is finally bolted has a lower surface pressure. In particular, since high temperature exhaust gas passes through the exhaust gas passage, such an uneven surface pressure significantly affects sealing performance.

In view of the foregoing background, it is therefore an object of the present disclosure to provide an internal combustion engine gasket capable of easily providing improved sealing performance.

Solution to the Problem

In order to achieve the above object, the present disclosure provides a spacer for reducing uneven contact of a grommet.

That is to say, a gasket for an internal combustion engine disclosed herein includes a plurality of annular plates that are stacked, the gasket being disposed between connection members of parts forming an exhaust gas passage of the engine to form the passage inside of annular plates. Each of the plurality of annular plates includes: a through-hole forming the exhaust gas passage with the gasket assembled between the connection members; an inner circumferential portion forming the through-hole; a plurality of bolt holes surrounding the through-hole; an outer circumferential portion having the plurality of bolt holes therein; and an intermediate portion disposed between the inner and outer circumferential portions. The plurality of annular plates include: a grommet plate disposed in a center in a stacking direction of the plurality of annular plates, and having a fold-back portion in the inner circumferential portion; and first and second seal plates stacked on both sides of the grommet plate in a thickness direction of the grommet plate, and each having a bead in the intermediate portion. The inner circumferential portion of the first seal plate is wrapped or held by the fold-back portion of the grommet plate. The gasket for an internal combustion engine further comprises a spacer member formed between the grommet plate and the first or second seal plate in the outer circumferential portions of the plurality of annular plates so as to include all of the plurality of bolt holes and to extend along the entire circumference of the outer circumferential portion. A thickness of the spacer member in the stacking direction of the plurality of annular plates is smaller than or equal to that of the grommet plate.

If a conventional gasket is provided with a grommet plate, the number of plates in a side adjacent to the exhaust gas passage is different from that in a side adjacent to the bolt depending on existence or nonexistence of the fold-back portion. Therefore, if one of a plurality of bolts is tightened, the fold-back portion is unevenly contacted toward the connection member. When the rest bolts are tightened, a surface pressure generated by the bead cannot be sufficiently generated.

In contrast, The gasket for an internal combustion engine of the present disclosure is provided with the spacer member around the volt holes. As a result, the number of the plates adjacent to the exhaust gas passage can be equalized with the number of the plates adjacent to the bolts. This can alleviate the state of the uneven contact of the fold-back portion of the grommet plate, keep an interval between the connection members constant along the entire circumference, and sufficiently and uniformly generate surface pressures generated by beads when a gasket for an internal combustion engine is installed between the connection members to improve the sealing performance of the gasket for an internal combustion engine.

In one preferred embodiment, the spacer member is provided between the second seal plate and the grommet plate. Therefore, the spacer member is disposed in the side of the grommet plate away from the first seal plate. Thus, this configuration can effectively generate the surface pressure generated by the bead of the first seal plate, and alleviate the state of the uneven contact of the fold-back portion to improve the sealing performance of the gasket.

In one preferred embodiment, each of the plurality of annular plates includes a bead in the intermediate portion, and the plurality of annular plates further include a third seal plate stacked on a side of the first seal plate away from the grommet plate, and the fold-back portion of the grommet plate abuts on the inner circumferential portion of the third seal plate when the gasket is installed between the connection members. This allows the bead of the first seal plate not to be completely squashed even after the bolts are tightened. As a result, the improved sealing performance can be maintained for a long period of time.

In one preferred embodiment, the fold-back portion of the grommet plate is formed by folding back the grommet plate toward an upstream side of an exhaust gas flow in the exhaust gas passage. The temperature of the upstream side of the exhaust gas is higher than that of the downstream side of the exhaust gas. Thus, folding back the fold-back portion toward the upstream side to reduce deterioration in the first seal plate. This allows for maintaining the improved sealing performance for a long period of time.

In one preferred embodiment, a thickness of the fold-back portion of the grommet plate is smaller than a height of the bead of the first seal plate in a state before the gasket is installed between the connection members. This configuration secures the surface pressure generated by the bead the first seal plate to obtain improved sealing performance of the gasket.

In one preferred embodiment, the internal combustion engine is a diesel engine, and the parts are an exhaust manifold and a turbocharger, and the gasket is provided between the connection member of the exhaust manifold and the connection member of the turbocharger. High temperature exhaust gas flows into the exhaust manifold gas from the exhaust gas pipe. Accordingly, the present disclosure can achieve improved sealing performance in the connection between the connection members.

Advantages of the Invention

In view of the foregoing description, the present disclosure can alleviate the state of the uneven contact of a fold-back portion of a grommet plate, keep an interval between flanges constant, and sufficiently generate surface pressures generated by beads when an gasket for an internal combustion engine is installed between the flanges to improve the sealing performance of the gasket for an internal combustion engine.

DETAILED DESCRIPTION

An embodiment of the present disclosure will now be described in detail with reference to the drawings. The following embodiments are merely exemplary ones in nature, and are not intended to limit the scope, applications, or use of the disclosure.

Figure 1:
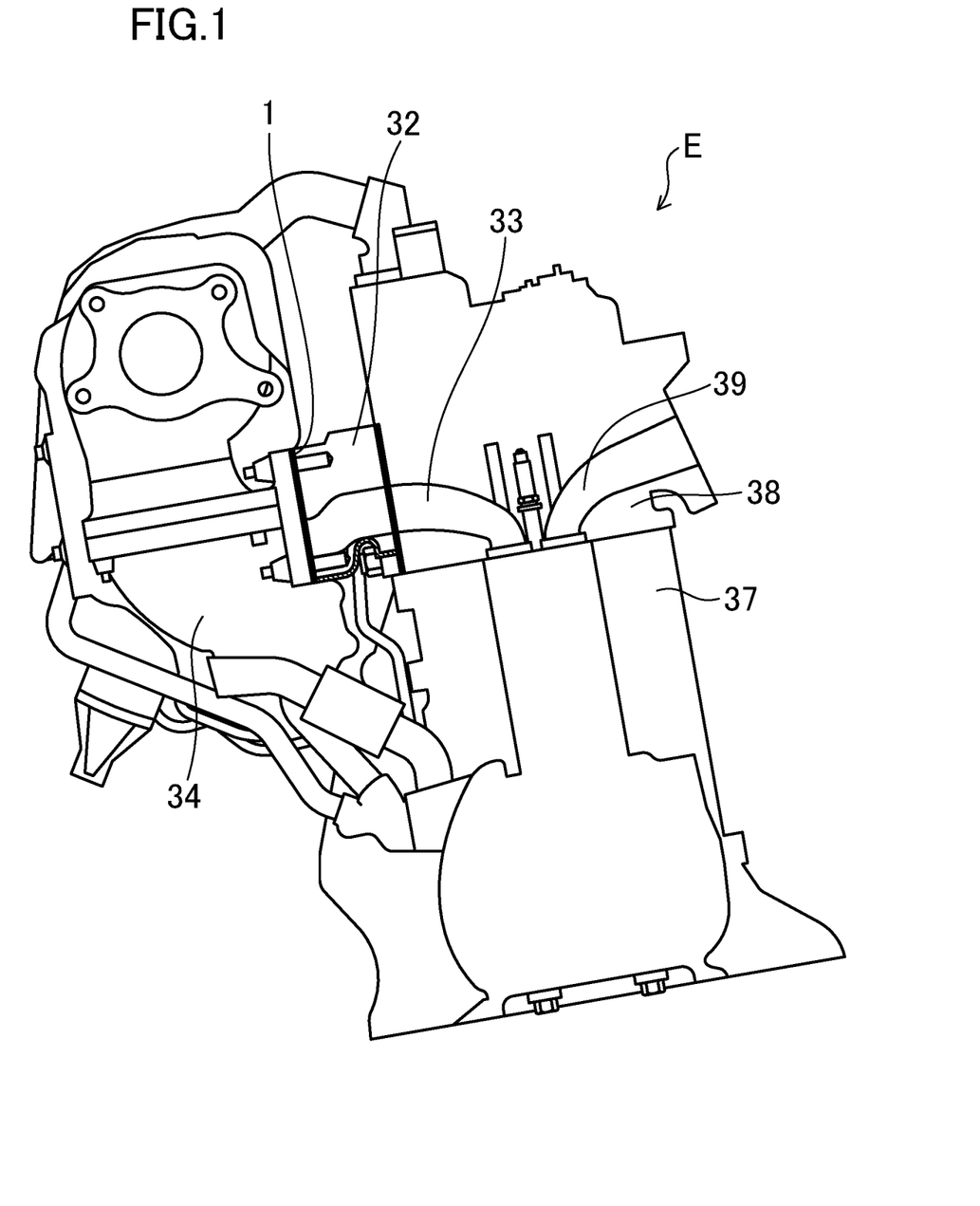
FIG. 1 is a schematic cross-sectional view schematically illustrating a configuration of a diesel engine including a gasket of an embodiment of the present disclosure.

As illustrated in FIG. 1, a diesel engine (internal combustion engine) E employing a gasket (gasket for an internal combustion engine) 1 according to this embodiment includes a cylinder block 37 having a plurality of cylinders, a cylinder head 38, and an inlet pipe 39 and an exhaust pipe 33 formed inside the cylinder head 38 and respectively connected to an inlet port and an exhaust port which are formed in the wall of the combustion chamber of the cylinder head 38. The gasket 1 is interposed between flanges (connection members) 35 and 36 that form a connection between a downstream end of an exhaust manifold (part) 32, which is connected to a downstream end of the exhaust pipe 33 and forms an exhaust gas passage inside thereof, and an upstream end of a turbocharger (part) 34 coupled to the downstream end of the exhaust manifold 32.

The exhaust gas passage is formed inside the exhaust manifold 32 such that the upstream end of the exhaust gas passage is connected to the exhaust pipes of the respective cylinders, the exhaust pipes are collected in a merging portion provided in the downstream portion of the exhaust gas passage, and the exhaust gas passage is introduced into the turbocharger 34. The downstream side of the turbocharger 34 is provided with a catalyst device for purifying exhaust gas. In order to activate the catalyst device early, the exhaust manifold 32 is an air-cooled manifold having no cooling water passage, and is configured such that high temperature exhaust-gas is introduced into the catalyst device.

Figure 2:
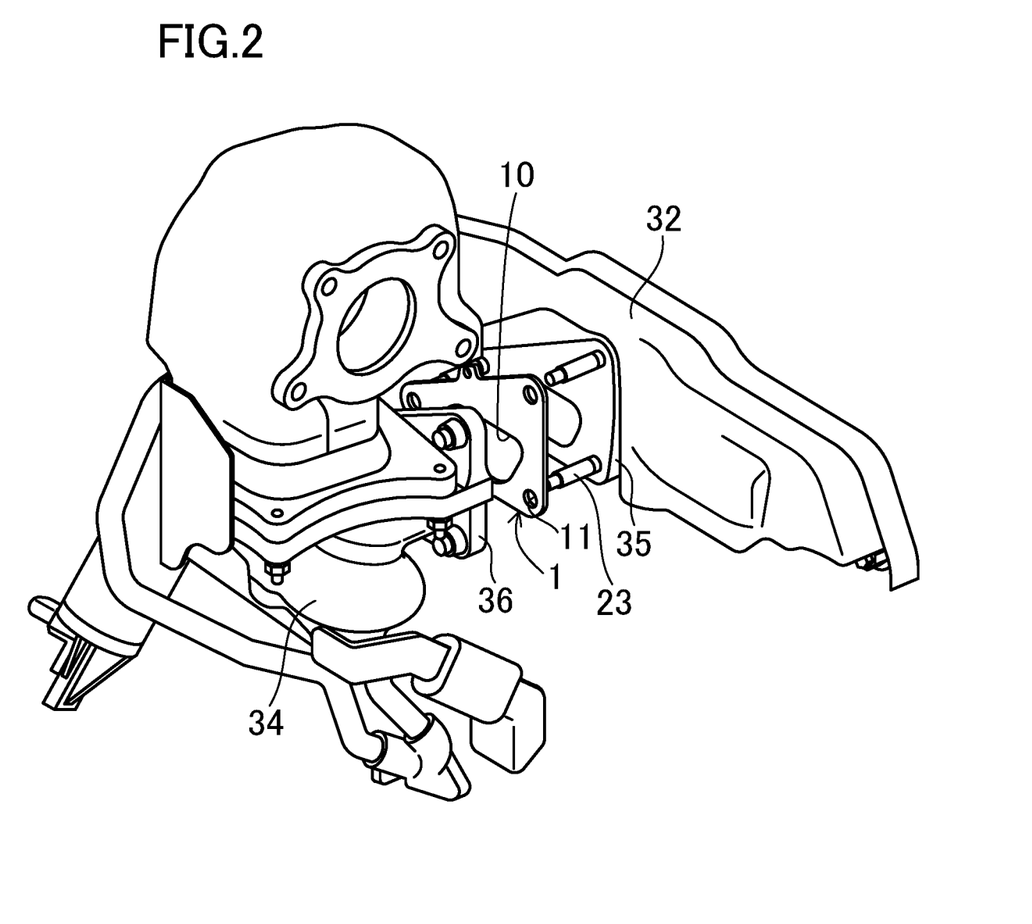
FIG. 2 is a schematic exploded perspective view illustrating the gasket of FIG. 1 in an installed state.
Figure 3:
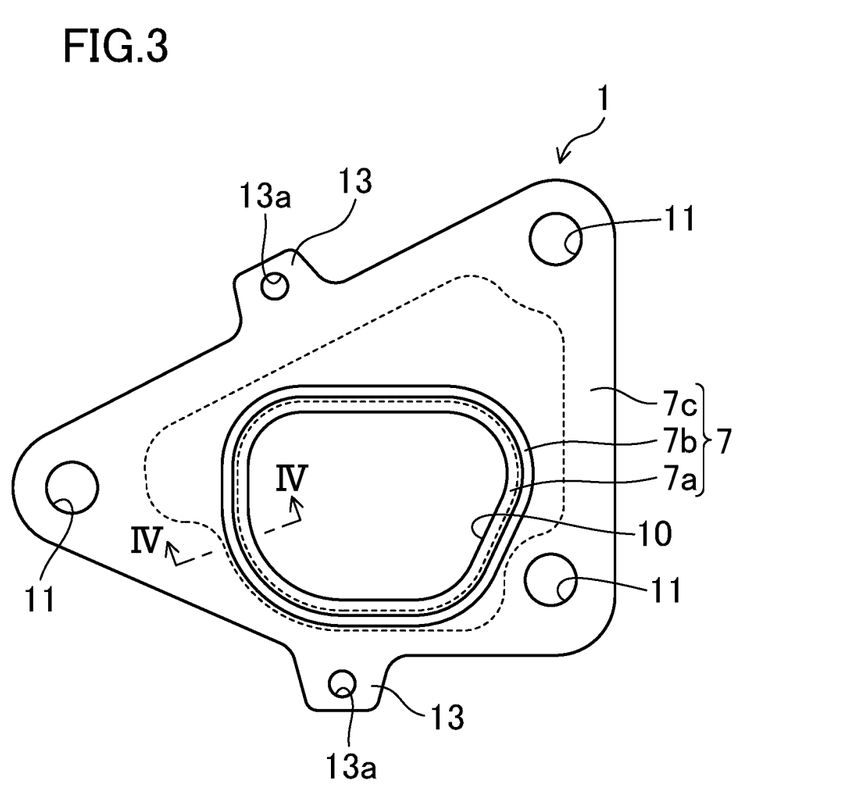
FIG. 3 is a plan view of the gasket of FIG. 1.
Figure 4:
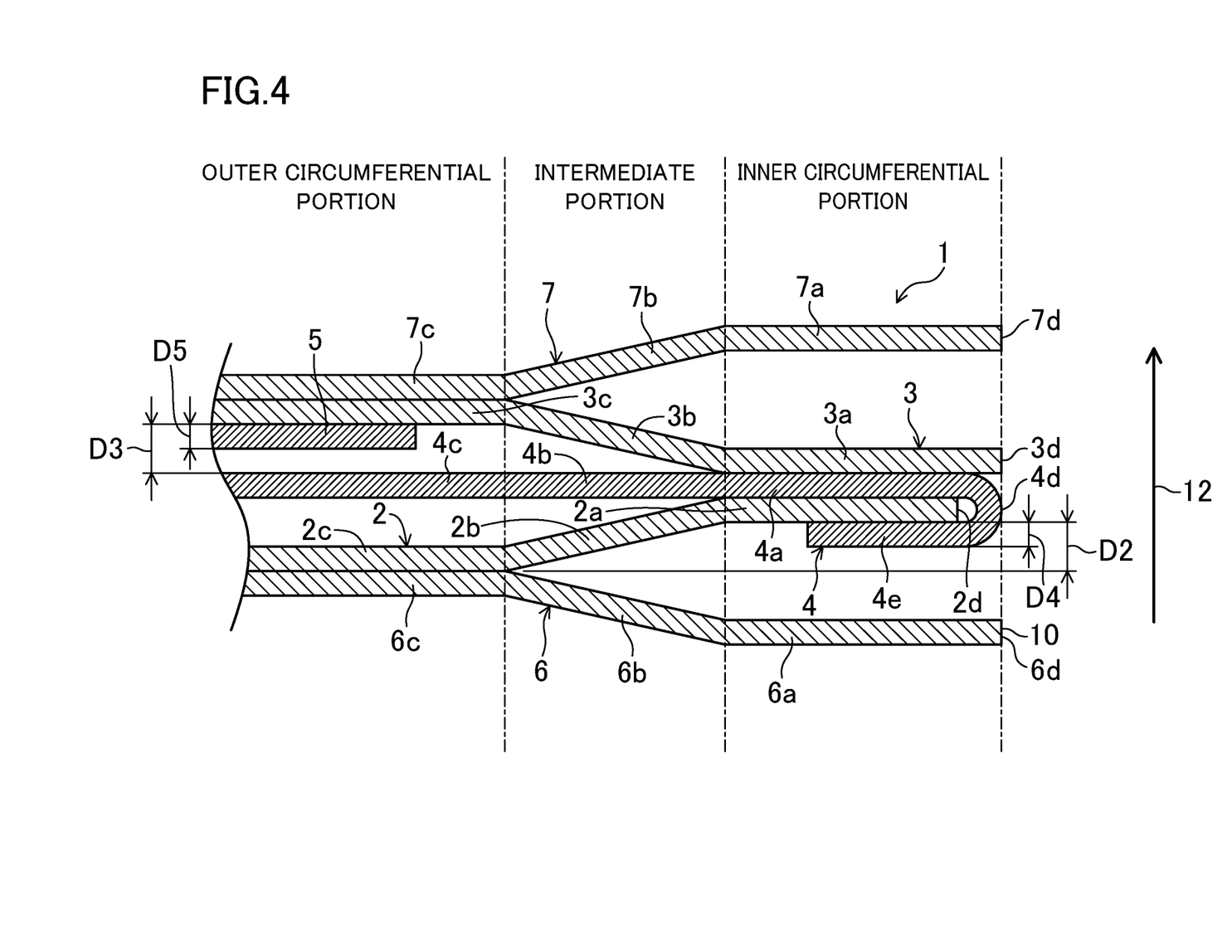
FIG. 4 is a cross-sectional view of the gasket along the arrows in FIG. 3.

As illustrated in FIGS. 2 to 4, the gasket 1 has an annular structure having a through-hole 10 in its inner circumferential side. A plurality of bolt holes 11, 11, . . . are formed around the through-hole 10. As illustrated in FIG. 2, the gasket 1 is disposed between the flange 35 adjacent to the exhaust manifold 32 and the flange 36 adjacent to the turbocharger 34, and is installed therebetween by tightening a plurality of bolts 23, 23, . . . passing through the respective bolt holes 11, 11, . . . . With the gasket 1 installed, the exhaust gas passage is formed inside the through-hole 10 that is formed in the inner circumference of the gasket 1.

In addition, as illustrated in FIG. 4, the gasket 1 has a multilayer structure in which a plurality of annular plates 2, 3, 4, 6, and 7 are stacked. The plurality of annular plates 2, 3, 4, 6, and 7 respectively correspond to a first seal plate 2, a second seal plate 3, a grommet plate 4, a third seal plate 6, and a fourth seal plate 7, which will be described later. The plurality of annular plates 2, 3, 4, 6, and 7, with having been installed between the flanges 35 and 36, respectively include through-holes 2d, 3d, 4d, 6d, and 7d, inner circumferential portions 2a, 3a, 4a, 6a, and 7a, outer circumferential portions 2c, 3c, 4c, 6c, and 7c, and intermediate portions 2b', 3b', 4b', 6b', and 7b'. Each of the annular plates 2, 3, 4, 6, and 7 further includes a plurality of bolt holes 2f, 3f, 4f, 6f, and 7f (not illustrated). The through-holes 2d, 3d, 4d, 6d, and 7d form an exhaust gas passage. The inner circumferential portions 2a, 3a, 4a, 6a, and 7a form the through-holes 2d, 3d, 4d, 6d, and 7d. The bolt holes 2f, 3f, 4f, 6f, and 7f are formed so as to surround the through-holes 2d, 3d, 4d, 6d, and 7d. Each of the outer circumferential portions 2c, 3c, 4c, 6c, and 7c has the bolt holes 2f, 3f, 4f, 6f, and 7f therein. The intermediate portions 2b', 3b', 4b', 6b', and 7b' are respectively disposed between the inner circumferential portions 2a, 3a, 4a, 6a, and 7a and the outer circumferential portions 2c, 3c, 4c, 6c, and 7c. The through-holes 2d, 3d, 4d, 6d, and 7d constitute the through-hole 10 of the gasket 1 with the gasket 1 installed between the flanges 35 and 36. The bolt holes 2f, 3f, 4f, 6f, and 7f constitute bolt holes 11, 11, . . . of the gasket 1 with the gasket 1 installed between the flanges 35 and 36. Furthermore, the intermediate portions 2b', 3b', 6b', and 7b' respectively function as beads 2b, 3b, 6b, and 7b, which will be described later.

An arrow 12 in FIG. 4 shows an exhaust gas flow direction in the exhaust gas passage configured as the through-hole 10 when the gasket 1 is installed between the flanges 35 and 36.

The grommet plate 4 is disposed in the center in the stacking direction of the annular plates 2, 3, 4, 6, and 7. The first seal plate 2 and the third seal plate 6 are sequentially stacked on one side of the grommet plate 4 in the thickness direction, in other words, in the upstream side of the exhaust gas flow adjacent to the exhaust manifold 32. The second seal plate 3 and the fourth seal plate 7 are sequentially stacked on the other side of the grommet plate 4, i.e., in the downstream side of the exhaust gas flow adjacent to the turbocharger 34. A spacer member 5, which will be described later, is provided between the grommet plate 4 and the second seal plate 3. The gasket 1, before being installed between the flanges 35 and 36, is fixed with a caulking tool (not illustrated) inserted into a fix hole 13a of a fix portion 13 to maintain its multilayer state.

The grommet plate 4 is provided to improve the strength and durability of the gasket 1. The grommet plate 4 includes the inner circumferential portion 4a, the intermediate portion 4b', the outer circumferential portion 4c, and the through-hole 4d. The intermediate portion 4b' forms a flat portion 4b between the inner circumferential portion 4a and the outer circumferential portion 4c. The inner circumferential portion 4a has a fold-back portion 4e by folding back the inner circumference of the inner circumferential portion 4a. This fold-back portion 4e wraps or holds the inner circumferential portion 2a of the first seal plate 2. Exhaust gas having a temperature of, e.g., approximately 700-850° C. flows into the exhaust manifold 32 from the exhaust pipe 33. Because of the fold-back portion 4e, even if the beads 2b, 3b, 6b, and 7b of the gasket 1 are squashed in the exhaust gas flow direction due to thermal deformation of the flanges 35 and 36, the bead 2b of the first seal plate 2 is not completely squashed and the surface pressure can be maintained. This allows for reducing a decrease in the sealing performance of the entire gasket 1. As illustrated in FIG. 4, the fold-back portion 4e may be folded back toward the exhaust manifold 32 located in the upstream side of the exhaust gas flow inside the exhaust gas passage formed by the through-hole 10, or conversely, toward the turbocharger 34 located in the downstream side of the flow. It may be more preferably folded back toward the exhaust manifold 32 that is exposed to relatively high-temperature exhaust gas, and causes relatively large thermal deformation of the flange. The material of the grommet plate 4 is preferably, but is not particularly limited to, a metal material having a high hardness and excellent bendability. For example, stainless steel can be preferably used. The specific thickness of the grommet plate 4 in the stacking direction may be, but is not particularly limited to, e.g., 0.2 mm-1.0 mm in order to improve the strength and durability of the gasket 1. during installation of the gasket 1 between the flanges 35 and 36, in order to secure a surface pressure generated by this bead 2b of the first seal plate 2, and provide improved sealing performance of the gasket 1, the thickness D4 of the fold-back portion 4e of the grommet plate 4 is preferably smaller than the height D2 of the bead 2b of the first seal plate 2, which will be described later, in a state before the gasket 1 is installed between the flanges 35 and 36.

The first seal plate 2 is provided so as to provide improved sealing performance of the gasket 1. In order to improve sealing performance around the exhaust gas passage, the first seal plate 2 includes the intermediate portion 2b' having the bead 2b surrounding the through-hole 2d. The bead 2b is a so-called half bead formed by bending the intermediate portion 2b' from the side of the outer circumferential portion 2c of the first seal plate 2 toward one side of the first seal plate 2 in the thickness direction, i.e., toward the turbocharger 34 in this embodiment, and further bending the inner circumferential portion 2a so that the inner circumferential portion 2a is parallel to the outer circumferential portion 2c. Applying a load to the bead 2b in the direction opposite to the bending direction of the bead 2b with a bolt axial force with installed between the flanges 35 and 36 generates a surface pressure in the stacking direction to provide improved sealing performance. The specific height of the bead 2b in the stacking direction may be, but is not particularly limited to, e.g., 0.2 mm-1.0 mm in a state prior to installation between the flanges 35 and 36. As described above, the fold-back portion 4e of the grommet plate 4 wraps or holds the inner circumferential portion 2a of the first seal plate 2. In a state prior to installation between the flanges 35 and 36, as illustrated in FIG. 4, there exists a space between the grommet plate 4 and the outer circumferential portion 2c of the first seal plate 2, the space having a size corresponding to the height D2 of the bead 2b. The thickness of the first seal plate 2 in the stacking direction may be, but is not particularly limited to, e.g., 0.2 mm-1.0 mm in order to improve the sealing performance of the gasket 1.

The second seal plate 3 is provided so as to provide improved sealing performance of the gasket 1. In order to improve sealing performance around the exhaust gas passage, the second seal plate 3 includes the intermediate portion 3b' having the bead 3b surrounding the through-hole 3d. The bead 3b is a so-called half bead formed by bending the intermediate portion 3b' from the side of the outer circumferential portion 3c of the second seal plate 3 toward one side of the second seal plate 3 in the thickness direction, i.e., toward the exhaust manifold 32 in this embodiment, and further bending the inner circumferential portion 3a so that the inner circumferential portion 3a is parallel to the outer circumferential portion 3c. Applying a load to the bead 3b in the direction opposite to the bending direction of the bead 3b with a bolt axial force with the gasket 1 installed between the flanges 35 and 36 generates a surface pressure in the stacking direction to provide improved sealing performance The second seal plate 3 is stacked on the grommet plate 4 away from the first seal plate 2. That is to say, the first seal plate 2 and the second seal plate 3 are stacked on the both sides of the grommet plate 4. The inner circumferential portion 3a of the second seal plate 3 abuts on the grommet plate 4 with being installed. The bead 3b has a height D3 in the stacking direction so as to rise with respect to the grommet plate 4 in the direction opposite to the rising direction of the bead 2b of the first seal plate 2. The specific thickness of the second seal plate 3 in the stacking direction may be, but is not particularly limited to, e.g., 0.2 mm-1.0 mm in order to improve the sealing performance of the gasket 1.

The third seal plate 6 is provided so as to improve sealing performance and durability of the gasket 1. In order to improve sealing performance around the exhaust gas passage, the third seal plate 6 includes the intermediate portion 6b' having the bead 6b surrounding the through-hole 6d. The bead 6b is a so-called half bead formed by bending the intermediate portion 6b' from the side of the outer circumferential portion 6c of the third seal plate 6 toward one side of the third seal plate 6 in the thickness direction, i.e., toward the exhaust manifold 32 in this embodiment, and further bending the inner circumferential portion 6a so that the inner circumferential portion 6a is parallel to the outer circumferential portion 6c. Applying a load to the bead 6b in the direction opposite to the bending direction of the bead 6b with a bolt axial force with the gasket 1 installed between the flanges 35 and 36 generates a surface pressure in the stacking direction to provide improved sealing performance The third seal plate 6 is stacked on one side of the first seal plate 2 away from the grommet plate 4. When the gasket 1 is installed between the flanges 35 and 36, the fold-back portion 4e of the grommet plate 4 abuts on the inner circumferential portion 6a of the third seal plate 6. This allows the bead 2b of the first seal plate 2 not to be completely squashed even after the bolts 23, 23, . . . are tightened. As a result, the improved sealing performance can be maintained for a long period of time. In addition, since the first seal plate 2 and the fold-back portion 4e of the grommet plate 4 are not directly exposed to high-temperature exhaust gas, the durability of the gasket 1 is also improved. The specific thickness of the third seal plate 6 in the stacking direction may be, but is not particularly limited to, e.g., 0.2 mm-1.0 mm in order to improve the sealing performance of the gasket 1.

The fourth seal plate 7 is provided so as to improve the sealing performance and durability of the gasket 1. In order to improve sealing performance around the exhaust gas passage, the fourth seal plate 7 includes the intermediate portion 7b' having the bead 7b surrounding the through-hole 7d. The bead 7b is a so-called half bead formed by bending the intermediate portion 7b' from the side of the outer circumferential portion 7c of the fourth seal plate 7 toward one side of the fourth seal plate 7 in the thickness direction, i.e., toward the turbocharger 34 in this embodiment, and further bending the inner circumferential portion 7a so that the inner circumferential portion 7a is parallel to the outer circumferential portion 7c. Applying a load to the bead 7b in the direction opposite to the bending direction of the bead 7b with a bolt axial force with the gasket 1 installed between the flanges 35 and 36 generates a surface pressure in the stacking direction to provide improved sealing performance. The fourth seal plate 7 has the bead 7b in the inner circumferential side, and is stacked on the second seal plate 3 away from the grommet plate 4. The specific thickness of the fourth seal plate 7 in the stacking direction may be, but is not particularly limited to, e.g., 0.2 mm-1.0 mm in order to improve the sealing performance of the gasket 1.

The material of the first to fourth seal plates is preferably, but is not particularly limited to, a metal material having a high hardness and excellent thermal resistance. For example, stainless steel can be preferably used. The materials and thicknesses of the first to fourth seal plates may be the same or different from one another, but are preferably the same in terms of improving the sealing performance The heights of the beads 2b, 3b, 6b, and 7b of the first to fourth seal plates in the stacking direction may be the same or different from one another. Further, the radial widths of the beads 2b, 3b, 6b, and 7b of the first to fourth seal plates may be the same or different from one another, but are preferably the same in terms of improving the sealing performance of the gasket 1. In order to improve the sealing performance, as illustrated in FIG. 3, it is preferable that the beads 2b, 3b, 6b, and 7b be formed in positions closer to the inner circumference of the gasket 1, in particular, closer to the through-hole 10, and all of the beads 2b, 3b, 6b, and 7b be disposed in the same position in the radial direction when viewed in plan. In such a disposition, the distance from the through-hole 10 to each of the beads 2b, 3b, 6b, and 7b, that is to say, e.g., the radial width of each of the inner circumferential portions 3a, 6a, and 7a of the seal plates 3, 6, and 7 in FIG. 4 may be, e.g., 2.0 mm-4.0 mm. As illustrated in FIG. 4, the width of the inner circumferential portion 2a of the first seal plate 2 is smaller than that of each of the inner circumferential portions 3a, 6a, and 7a of other seal plates 3, 6, and 7, such that the width of the entire fold-back structure formed by the fold-back portion 4e of the grommet plate 4 is the same as those of the inner circumferential portions 3a, 6a, and 7a. In this case, the fold-back portion 4e preferably has such a width that the fold-back portion 4e does not reach the bead 2b. For example, the width of the fold-back portion 4e may be 1.5 mm-3.5 mm.

Figure 5:
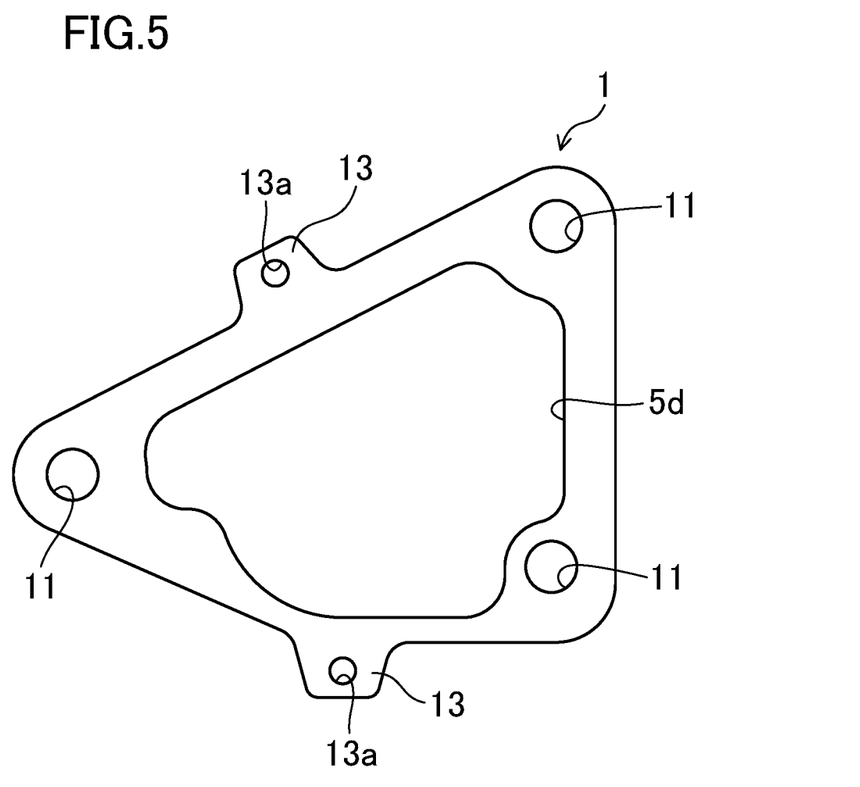
FIG. 5 is a plan view of a spacer member of the gasket of FIG. 3.

Here, the gasket 1 according to this embodiment is characterized in that the spacer member 5 is provided between the grommet plate 4 and the second seal plate 3, outward from the bead 3b of the second seal plate 3, in the entire circumference including the bolt holes 11, 11, . . . , as illustrated in FIGS. 3 and 5.

That is to say, the spacer member 5 is, as illustrated in FIG. 5, formed in the outer circumferential portions 3c and 4c of the second seal plate 3 and the grommet plate 4 so as to include all of the bolt holes 11, 11, . . . and to extend along the entire circumference of the outer circumferential portions 3c and 4c. In other words, as illustrated in FIG. 5, the through-hole 5d larger than the through-hole 10 is formed in the center of the spacer member 5. When the spacer member 5 is disposed between the grommet plate 4 and the second seal plate 3 and is installed between the flanges 35 and 36, the both sides of the spacer member 5 in the stacking direction only abut on the outer circumferential portions 3c and 4c of the second seal plate 3 and the grommet plate 4.

Figure 7:
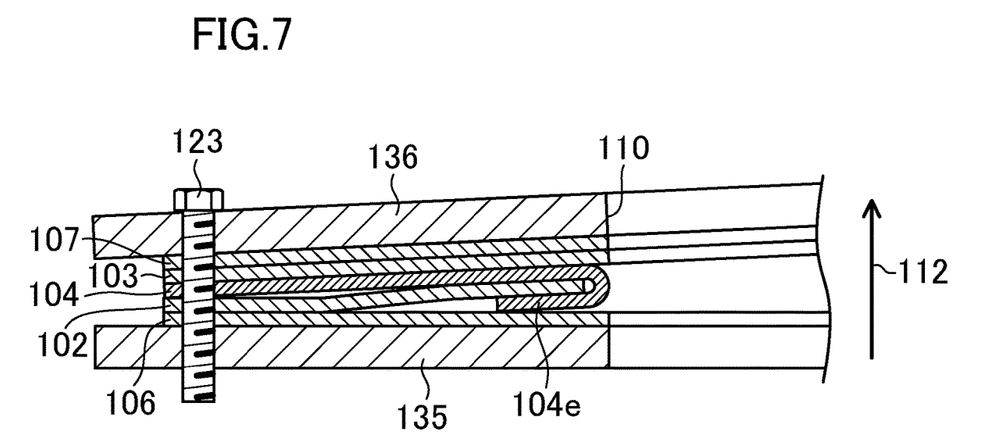
FIG. 7 is a view of a conventional gasket and corresponds to FIG. 6.

As illustrated in FIG. 7, in a conventional gasket, in a side closer to a through-hole 110 forming an exhaust gas passage through which exhaust gas flows in a direction of the arrow indicated by the character reference 112, because of a grommet plate 104 including a fold-back portion 104e, e.g., six plates, namely, a first seal plate 102, a second seal plate 103, the grommet plate 104, a third seal plate 106, and a fourth seal plate 107, are disposed, whereas five plates are disposed in a side closer to a bolt 123. The number of the plates is smaller in the side closer to the bolt 123 than in the side closer to the exhaust gas passage. As a result, in a step of tightening a plurality of bolts 123, tightening one bolt 123 causes the fold-back portion 104e of the grommet plate 104 to unevenly contact the third seal plate 106 in a side closer to the flange 135, whereby the flange 136 is inclined relative to the flange 135. As a result, when the rest bolts 123 are tightened, the rest bolts 123 are not sufficiently tightened, resulting in insufficient generation of the surface pressure generated by the beads.

Figure 6:
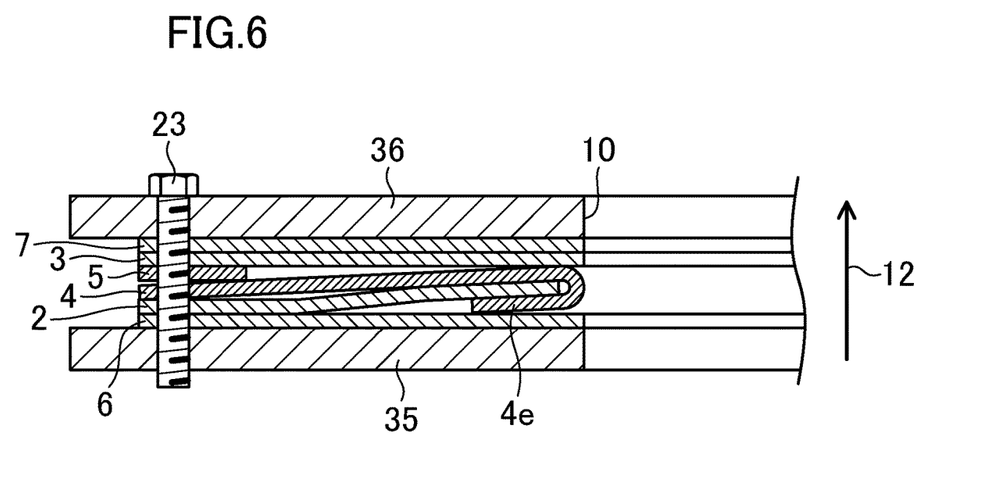
FIG. 6 is a transverse cross-sectional view of the gasket of FIG. 3 when the gasket is installed between flanges.

In contrast, the gasket 1 is provided with the spacer member 5 that is thinner than the fold-back portion 4e and surrounds the bolt holes 11. As a result, as illustrated in FIG. 6, the number of the plates adjacent to the exhaust gas passage can be equalized with that of the plates adjacent to the bolts. This can alleviate the state of the uneven contact of the fold-back portion 4e of the grommet plate 4 to keep the interval between the flanges 35 and 36 constant. The edge of the spacer member 5 adjacent to the through-hole 5d and the edge of the fold-back portion 4e of the grommet plate 4 away from the through hole are spaced at a predetermined distance, and the edge of the spacer member 5 adjacent to the through-hole 5d is disposed outward from the edge of the bead 3b away from the through-hole 3d, i.e., a bending start position. Such a configuration can sufficiently and uniformly generate the surface pressure generated by the beads 2b, 3b, 6b, and 7b, and improve the sealing performance of the gasket for an internal combustion engine when the gasket 1 is installed between the flanges 35 and 36. If the edge of the bead 3b away from the through-hole 3d coincides with the edge of the spacer member 5 adjacent to the through-hole 5d, the beads may not be squashed to be flat in a well manner. Providing the spacer member 5 in the entire circumference including the bolt holes 11, 11, . . . effectively allows the gasket 1 to have excellent sealing performance.

The spacer member 5 may be provided between the grommet plate 4 and the first seal plate 2 or between the grommet plate 4 and the second seal plate 3 in order to alleviate the state of the uneven contact of the fold-back portion 4e of the grommet plate 4. More preferably, as the configuration of the embodiment, the spacer member 5 is disposed in a side of the grommet plate 4 away from the first seal plate 2, i.e., away from the side toward which the grommet plate 4 is folded back and in which the fold-back portion 4e is formed. This configuration can effectively generate the surface pressure generated by the bead 2b of the first seal plate 2 in tightening the bolts 23, 23, . . . , and alleviate the state of the uneven contact of the fold-back portion 4e to allow the gasket 1 to uniformly have the sealing performance in the circumference of the through-hole 10. The spacer member 5 has a thickness thinner than the fold-back portion 4e, and this allows the fold-back portion 4e to serve as a bead when exhaust gas flows. If the grommet plate 4 is folded back toward a side adjacent to the second seal plate 3 to form the fold-back portion 4e, the spacer member 5 is preferably disposed between the grommet plate 4 and the first seal plate 2.

The material of the spacer member 5 is preferably, but is not particularly limited to, a metal material having a high hardness and excellent thermal resistance. For example, stainless steel can be preferably used. It is preferable that he thickness D5 of the spacer member 5 in the stacking direction in which the annular plates 2, 3, 4, 6, and 7 are stacked be less than or equal to the thickness of the fold-back portion 4e of the grommet plate 4 and should not be far different from the thickness of the fold-back portion 4e of the grommet plate 4. Specifically, the thickness D5 of the spacer member 5 may be set in a range of 0.1 mm-0.95 mm, for example.

(Other Embodiments)

In the above embodiment, the gasket 1 is applied to an automobile diesel engine E. It is also applicable to other gasoline engines.

In the above embodiment, the gasket 1 is disposed between the exhaust manifold 32 and the turbocharger 34. Alternatively, for example, the through-hole 10 may include a plurality of the through-holes 10, and the gasket 1 may be disposed between the flange of the cylinder head 38 and the flange of the exhaust manifold or between flanges in a connection portion of other exhaust system parts. The gasket 1 may be applicable to a gasket disposed not only between the flanges in the exhaust system parts, but also between flanges in a connection portion of intake system parts, such as flanges connecting an exhaust gas recirculation (EGR) cooler and an exhaust gas recirculation (EGR) pipe together.

In the above embodiment, the third seal plate 6, and the fourth seal plate 7 are provided. In order to, e.g., reduce the manufacturing steps, neither of them or only one of them may be provided. In order to reduce damage to the flange 35 due to, e.g., thermal deformation of the fold-back portion 4e of the grommet plate 4, at least the third seal plate 6 is preferably provided. Also, in order to improve the sealing performance and durability of the gasket 1, additional seal plates may be provided outside the third seal plate 6 and the fourth seal plate 7, i.e., in a side closer to the exhaust manifold 32 and a side closer to the turbocharger 34.

INDUSTRIAL APPLICABILITY

The present disclosure is quite useful because it can alleviate the state of the uneven contact of a fold-back portion of a grommet plate, keep an interval between flanges constant, and sufficiently generate surface pressures generated by beads when an gasket for an internal combustion engine is installed between the flanges to improve the sealing performance of the gasket for an internal combustion engine.

DESCRIPTION OF REFERENCE CHARACTERS

1 Gasket (Gasket for Internal Combustion Engine)
2 First Seal Plate
2a Inner Circumferential Portion (of First Seal Plate)
2b Bead (of First Seal Plate)
2b' Intermediate Portion (of First Seal Plate)
2c Outer Circumferential Portion (of First Seal Plate)
2d Through-hole (of First Seal Plate)
2f Bolt Hole (of First Seal Plate)
3 Second Seal Plate
3a Inner Circumferential Portion (of Second Seal Plate)
3b Bead (of Second Seal Plate)
3b' Intermediate Portion (of Second Seal Plate)
3c Outer Circumferential Portion (of Second Seal Plate)
3d Through-hole (of Second Seal Plate)
3f Bolt Hole (of Second Seal Plate)
4 Grommet Plate
4a Inner Circumferential Portion (of Grommet Plate)
4b Flat Portion (of Grommet Plate)
4b' Intermediate Portion (of Grommet Plate)
4c Outer Circumferential Portion (of Grommet Plate)
4d Through-hole (of Grommet Plate)
4f Bolt Hole (of Grommet Plate)
5 Spacer Member
6 Third Seal Plate
6a Inner Circumferential Portion (of Third Seal Plate)
6b Bead (of Third Seal Plate)
6b' Intermediate Portion (of Third Seal Plate)
6c Outer Circumferential Portion (of Third Seal Plate)
6d Through-hole (of Third Seal Plate)
6f Bolt Hole (of Third Seal Plate)
7 Fourth Seal Plate
7a Inner Circumferential Portion (of Fourth Seal Plate)
7b Bead (of Fourth Seal Plate)
7b' Intermediate Portion (of Fourth Seal Plate)
7c Outer Circumferential Portion (of Fourth Seal Plate)
7d Through-hole (of Fourth Seal Plate)
7f Bolt Hole (of Fourth Seal Plate)
10 Through-hole
11 Bolt Hole
32 Exhaust Manifold (Part)
34 Turbocharger (Part)
35 Flange (Connection Member) (adjacent to Exhaust Manifold)
36 Flange (Connection Member) (adjacent to Turbocharger)
E Diesel Engine (Internal Combustion Engine)

The invention claimed is:

1. A gasket for an internal combustion engine comprising a plurality of annular plates that are stacked, the gasket being disposed between connection members of parts forming an exhaust gas passage of the engine to form the passage inside of annular plates, wherein
   each of the plurality of annular plates includes:
      a through-hole forming the exhaust gas passage with the gasket assembled between the connection members;
      an inner circumferential portion forming the through-hole;
      a plurality of bolt holes surrounding the through-hole;
      an outer circumferential portion having the plurality of bolt holes therein; and
      an intermediate portion disposed between the inner and outer circumferential portions,
   the plurality of annular plates include:
      a grommet plate disposed in a center in a stacking direction of the plurality of annular plates, and having a fold-back portion in the inner circumferential portion; and first and second seal plates stacked on portions of both sides of the grommet plate in a thickness direction of the grommet plate, and each having a bead in the intermediate portion, the inner circumferential portion of the first seal plate is wrapped or held by the fold-back portion of the grommet plate, the internal combustion engine gasket further comprises a spacer member formed between the grommet plate and the first or second seal plate in the outer circumferential portions of the plurality of annular plates so as to include all of the plurality of bolt holes and to extend along the entire circumference of the outer circumferential portion, a thickness of the spacer member in the stacking direction of the plurality of annular plates is smaller than or equal to that of the grommet plate, the number of the plates adjacent to the exhaust gas passage is equalized with that of the plates adjacent to the bolt holes, the fold-back portion of the grommet plate is formed by folding back the grommet plate toward an upstream side of an exhaust gas flow in the exhaust gas passage, the internal combustion engine is a diesel engine, and the parts are an exhaust manifold and a turbocharger, and the gasket is provided between the connection member of the exhaust manifold and the connection member of the turbocharger.

2. The gasket for an internal combustion engine of claim 1, wherein the spacer member is provided between the second seal plate and the grommet plate.

3. The gasket for an internal combustion engine of claim 2, wherein each of the plurality of annular plates includes a bead in the intermediate portion, and the plurality of annular plates further include a third seal plate stacked on a side of the first seal plate away from the grommet plate, and the fold-back portion of the grommet plate abuts on the inner circumferential portion of the third seal plate when the gasket is installed between the connection members.

4. The gasket for an internal combustion engine of claim 1, wherein a thickness of the fold-back portion of the grommet plate is smaller than a height of the bead of the first seal plate in a state before the gasket is installed between the connection members.

5. The gasket for an internal combustion engine of claim 1, wherein the internal combustion engine is a diesel engine, and the parts are an exhaust manifold and a turbocharger, and the gasket is provided between the connection member of the exhaust manifold and the connection member of the turbocharger.

6. The gasket for an internal combustion engine of claim 2, wherein the fold-back portion of the grommet plate is formed by folding back the grommet plate toward an upstream side of an exhaust gas flow in the exhaust gas passage.

7. The gasket for an internal combustion engine of claim 3, wherein the fold-back portion of the grommet plate is formed by folding back the grommet plate toward an upstream side of an exhaust gas flow in the exhaust gas passage.

8. The gasket for an internal combustion engine of claim 2, wherein a thickness of the fold-back portion of the grommet plate is smaller than a height of the bead of the first seal plate in a state before the gasket is installed between the connection members.

9. The gasket for an internal combustion engine of claim 3, wherein a thickness of the fold-back portion of the grommet plate is smaller than a height of the bead of the first seal plate in a state before the gasket is installed between the connection members.

10. The gasket for an internal combustion engine of claim 5, wherein a thickness of the fold-back portion of the grommet plate is smaller than a height of the bead of the first seal plate in a state before the gasket is installed between the connection members.

11. The gasket for an internal combustion engine of claim 2, wherein the internal combustion engine is a diesel engine, and the parts are an exhaust manifold and a turbocharger, and the gasket is provided between the connection member of the exhaust manifold and the connection member of the turbocharger.

12. The gasket for an internal combustion engine of claim 3, wherein the internal combustion engine is a diesel engine, and the parts are an exhaust manifold and a turbocharger, and the gasket is provided between the connection member of the exhaust manifold and the connection member of the turbocharger.

13. The gasket for an internal combustion engine of claim 4, wherein the internal combustion engine is a diesel engine, and the parts are an exhaust manifold and a turbocharger, and the gasket is provided between the connection member of the exhaust manifold and the connection member of the turbocharger.

* * * * *